Dec. 1, 1942. H. R. POETKER 2,303,795
LIQUID PROPULSION ENGINE
Filed May 5, 1941 3 Sheets-Sheet 1

INVENTOR
Henry R. Poetker
John A. Naismith
ATTORNEY

Dec. 1, 1942.  H. R. POETKER  2,303,795
LIQUID PROPULSION ENGINE
Filed May 5, 1941  3 Sheets-Sheet 2
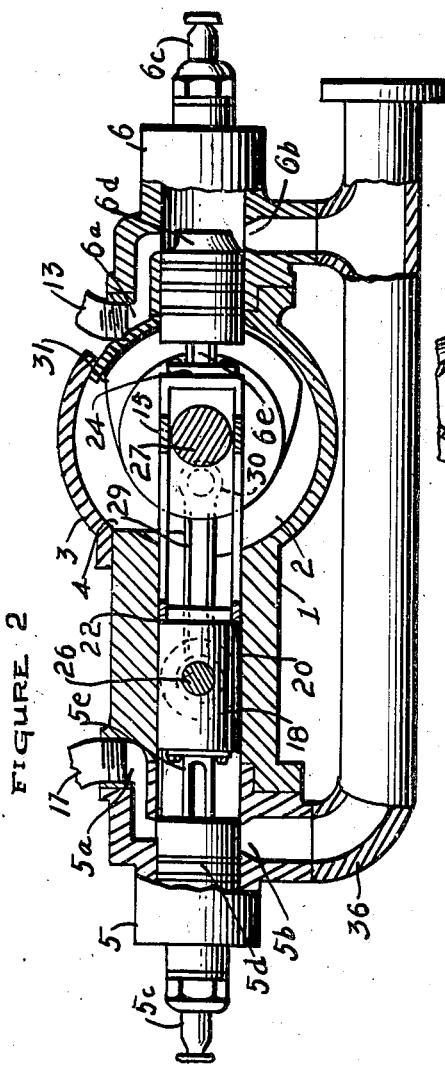
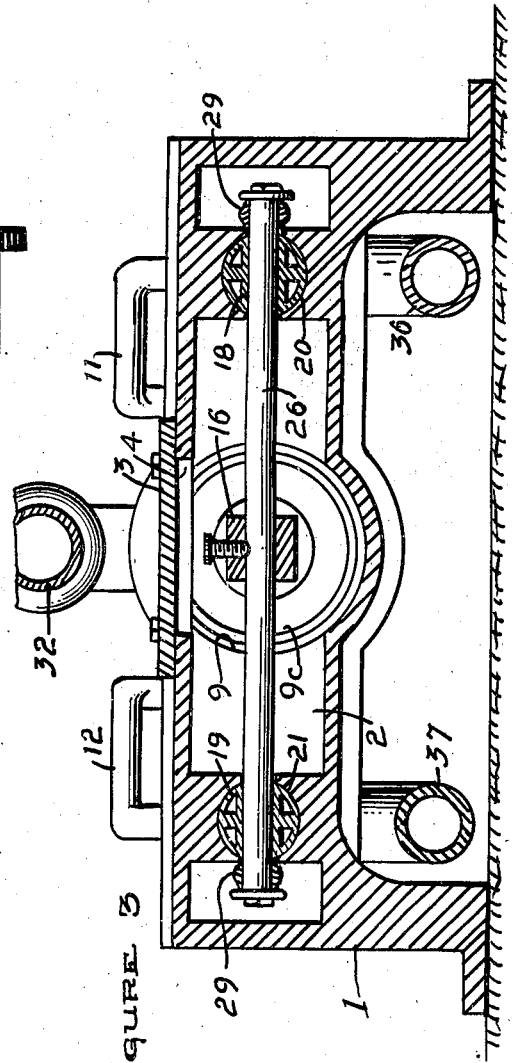
INVENTOR
Henry R. Poetker
John A. Naismith
ATTORNEY Dec. 1, 1942.                H. R. POETKER                 2,303,795
                        LIQUID PROPULSION ENGINE
                          Filed May 5, 1941              3 Sheets-Sheet 3
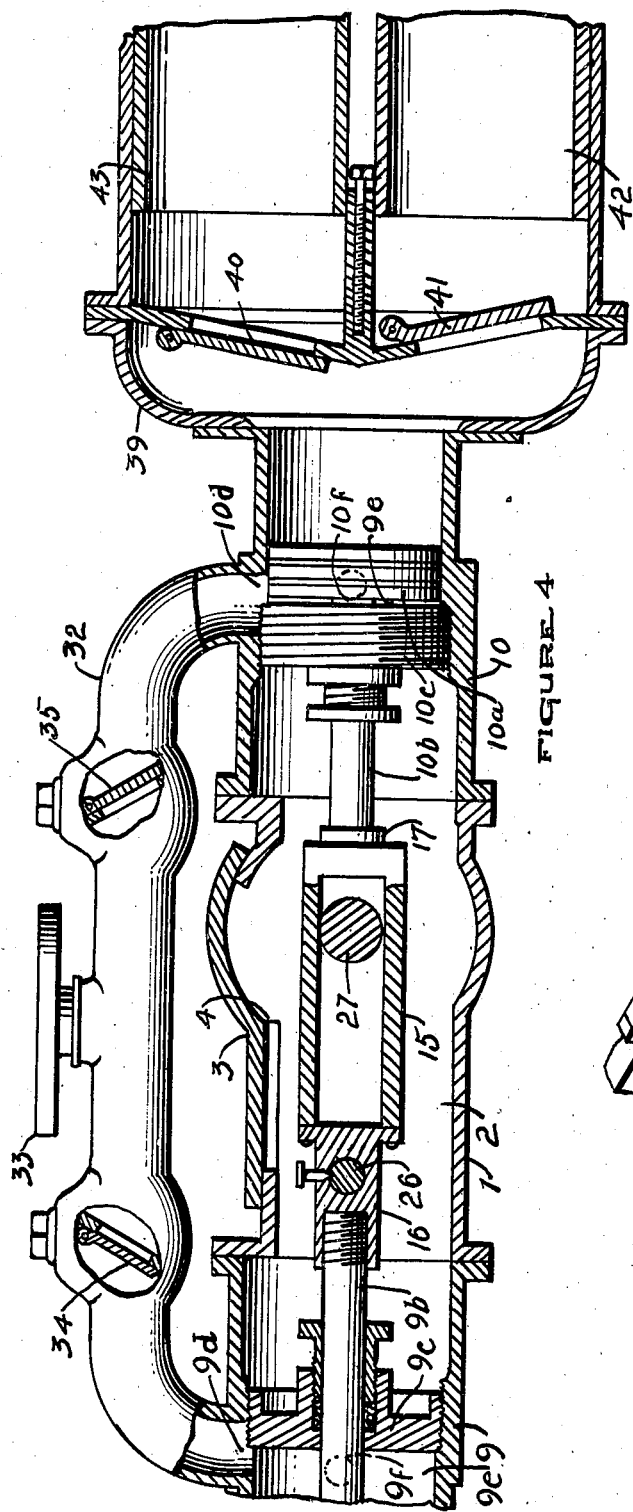
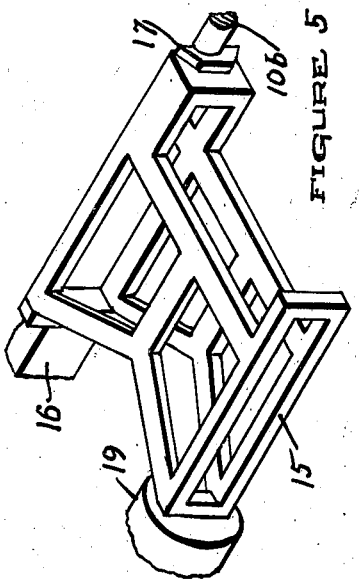
INVENTOR
Henry R. Poetker
John A. Naismith
ATTORNEY Patented Dec. 1, 1942

2,303,795

UNITED STATES PATENT OFFICE 2,303,795

LIQUID PROPULSION ENGINE

Henry R. Poetker, Fresno, Calif.

Application May 5, 1941, Serial No. 391,832

4 Claims. (Cl. 123—56)

The present invention relates particularly to a combination internal combustion engine and pump.

It is one object of the invention to provide a device of the character indicated wherein the power developed by explosion of gaseous mixtures in cooperating cylinders is carried to the point of delivery for the performance of useful work without the use of crank-shafts, gears, or other devices that materially reduce its efficiency.

It is another object to provide a device of the character indicated wherein the power developed by the explosion of combustible gaseous mixtures is utilized to reciprocate a pump piston, and wherein the pump piston is utilized to force liquids for the performance of useful work and at the same time actively take part in the formation of the combustible mixtures and in the disposal of the burnt gases resulting from the explosion.

It is also an object to provide a device of the character indicated that will be compact in form, that consists of few parts considering the work performed, that will be economical to manufacture, and highly efficient in its practical application.

In the drawings:

Figure 2 is a sectional view on line 2—2 of Figure 1, partly in elevation and with parts broken away.

Figure 3 is a sectional view on line 3—3 of Figure 1, partly in elevation and with a part broken away.

Figure 4 is a sectional view on line 4—4 of Figure 1, partly in elevation and with parts broken away.

Figure 5 is a perspective illustration of one-half of the cross-head with parts attached thereto.

Figure 1:
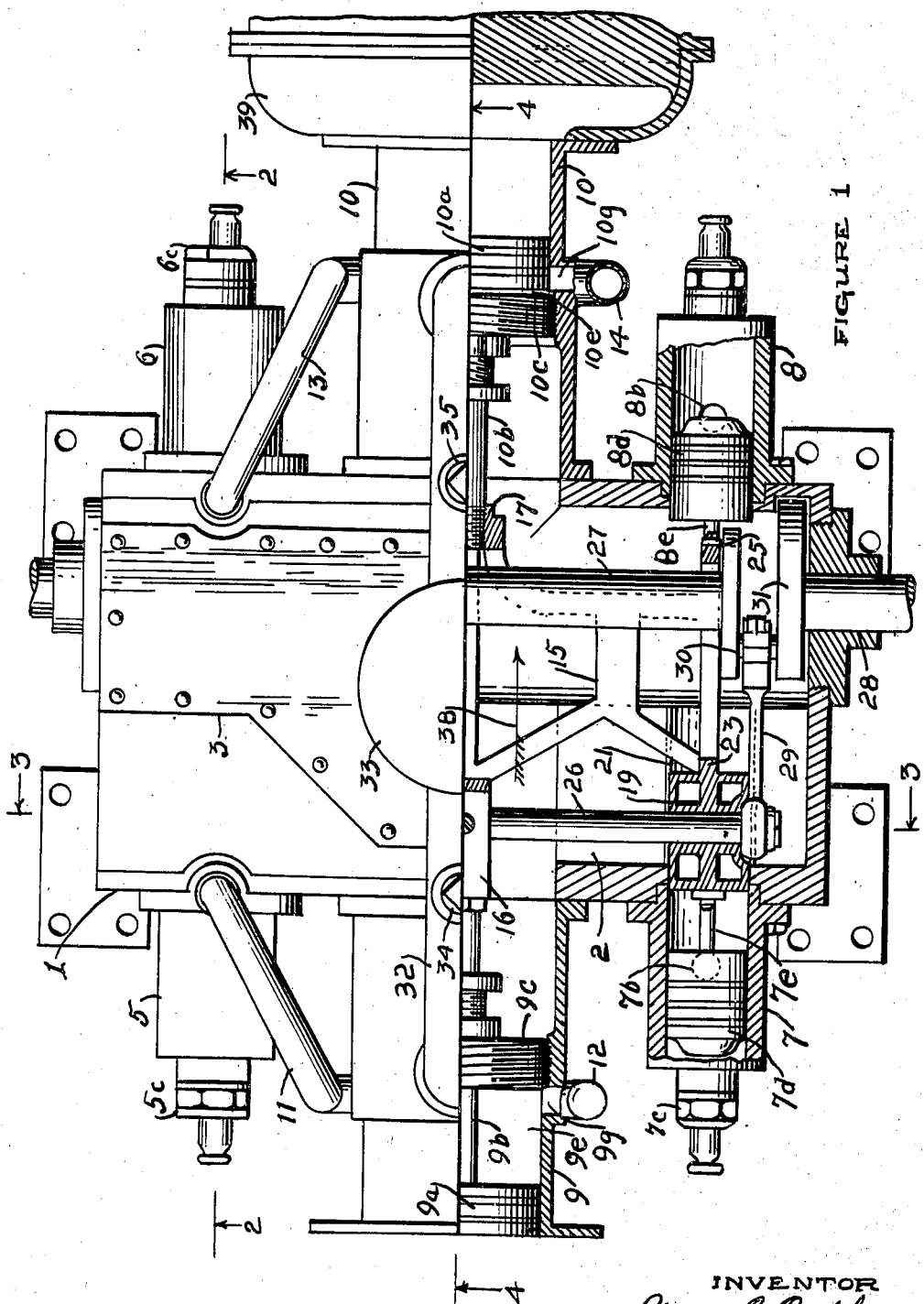
Figure 1 is a top plan view of the device embodying my invention, one-half being in section.

Referring now more particularly to the drawings, I show at 1 a rectangular housing which forms the body of the structure and defines the chamber 2 which is fitted with a top closure 3 over top opening 4.

Mounted on opposite sides of the body, and disposed in axial alignment, are cylinders arranged in pairs as 5—6, 7—8, and 9—10.

The cylinders 5, 6, 7 and 8, and their cooperating pistons and parts are identical in every way, therefore a detailed description of one will apply equally as well to the others, and the same may be said of cylinders 9 and 10.

The cylinder 5 is provided with an intake port 5a and an exhaust port 5b, and spark plug 5c, as usually arranged in a two-cycle engine, and with a piston 5d with its piston rod 5e.

The cylinder 9 is fitted with a piston 9a with its piston rod 9b axially slidable in bearing member 9c positioned in the cylinder. The cylinder 9 has an intake port 9d formed therein to communicate with the cylinder at a point between the piston 9a and the bearing member 9c, the portion of the cylinder between the piston and bearing member forming a compression chamber 9e.

The compression chamber 9e is provided with discharge ports 9f and 9g adjacent the bearing member.

Port 9f in cylinder 9 is connected with port 5a in cylinder 5 by a conduit 11; port 9g with port 7a by conduit 12; port 10f with port 6a by conduit 13; and port 10g with port 8a by conduit 14.

At 15 is shown a cross-head extending lengthwise of the chamber 2 and mounted to reciprocate therein between the cylinders on the opposite sides thereof, this reciprocation being in the plane of the several piston rods.

Fixedly secured to the center of one of the longer edges of the cross-head is the piston rod 9b, as at 16, and opposite thereto is the fixed connection 17 to piston rod 10b.

Fixedly connected to each of the piston rods 5e and 7e is a cylinder as at 18 and 19 respectively slidably mounted in their respective guideways as 20 and 21 and mounted on the adjacent corners of the cross-head 15 as at 22 and 23.

The piston rods 6e and 8e are also fixedly connected to adjacent corners of the cross-head 15 as indicated at 24 and 25.

At 26 is shown a shaft lying in the plane of the several piston rods and disposed to pass through the parts 18, 16 and 19 in parallel relation with the longer axis of chamber 2.

At 27 is shown a shaft journaled as at 28 in the end walls of chamber 2 in parallel relation with shaft 26. On each end of shaft 26 is mounted a crank 29 eccentrically connected to shaft 27 at 30 and counter-balancing member 31.

At 32 is shown an intake manifold connecting the intake ports 9d and 10d and fitted with a centrally disposed carbureter at 33. In the manifold 32, one on either side of the carbureter, is disposed a flap-valve as indicated at 34 and 35.

The exhaust ports 5b and 6b of cylinders 5 and 6 are connected to an exhaust manifold 36, and the exhaust ports 7b and 8b of cylinders 7 and 8 are connected to an exhaust manifold 37.

It may now be readily understood that the six pistons 5d, 6d, 7d, 8d, 9a and 10a all move as a single, integral unit with the cross-head 15. The power strokes of the pistons 5d and 7d alternate with the power strokes of the pistons 6d and 8d, consequently the pistons 9a and 10a are operated equally and positively in both directions.

Now, assuming that the piston 9a has reached the end of its outward stroke, as in Figure 1, and has drawn into chamber 9e a charge of the combustible gaseous mixture from carbureter 33, the pistons 5d and 7d being at the end of their compression strokes. The explosive mixtures in the cylinders 5 and 7 are exploded simultaneously, and the cross-head 15 is driven in the direction indicated by the arrow 38 thereby pulling in the piston 9a and compressing the charge there in chamber 9e and conduits 11 and 12. At the close of the power stroke when the mixture in conduits 11 and 12 is under great compression the inlet and exhaust ports 5a—5b in cylinder 5, and the inlet and exhaust ports 7a and 7b in cylinder 7, are simultaneously opened and the scavenging and refilling of the cylinders 5 and 7 is accomplished in the usual manner.

When the pistons 5d and 7d move back again on their compression strokes the piston 9a is caused to draw a fresh combustible charge into the chamber 9e and the cycle is completed.

On the outer end of cylinder 10 is a tubular section 39 fitted with inwardly and outwardly operating flap valves as 40 and 41 respectively, each valve communicating with a discharge or supply pipe as the case may be as at 42 and 43.

When the piston 10a is forcibly drawn inwardly of its cylinder 10 as hereinbefore described fluid will be forcibly inducted into the section 39 and cylinder 10 through valve 40, and when the piston is driven in the opposite direction the fluid will be driven out through the valve 41, for the performing of useful work. A duplicate structure is mounted on the outer end of the cylinder 9, of course.

It will be noted that most of the power developed in the cylinders 5, 6, 7 and 8 is used in the operation of pistons 9a and 10a, which pistons do the actual work of moving fluid through valves 40—41, and that since the power is applied equally but alternately or simultaneously on opposite sides of the device, it is perfectly balanced. The specific arrangement of the several parts minimizes the loss of power through friction, so that almost all of the power developed is usefully employed.

Although but one specific embodiment of the invention has been herein illustrated and described, it will be understood that various alterations in the details of construction and mode of assembly and operation may be made without departing from the scope of the invention as indicated in the appended claims.

I claim:

1. A liquid propulsion engine comprising, in combination, a cross-head chamber and a cross-head mounted to reciprocate therein, two pairs of opposed two-cycle internal combustion engines mounted on the chamber with their pistons connected to the cross-head to move as a unit therewith, a pair of opposed force pumps mounted on the chamber with their pistons connected to the cross-head to move as a unit therewith, a suction-compression chamber formed in each pump cylinder in operative relation to its piston head, a valve controlled intake manifold connected to each of said last named chambers and conduits connecting each of said chambers with the combustion chambers of the two adjacent engines.

2. A liquid propulsion engine comprising, supporting means, pairs of opposed two-cycle internal combustion engines mounted thereon, opposed force pumps mounted thereon, each force pump cylinder having a compressor chamber and a liquid-pumping chamber formed therein on opposite sides of its piston head, means operative to coordinate the movements of the engine and pump pistons, means operative to introduce explosive gas mixtures into the compressor chambers when the pistons therein move in one direction, means operative to conduct the compressed explosive mixtures from the compressor chambers to the explosion chambers of the engines when the pump pistons move in the opposite direction, and a valve controlled conduit leading to and from the liquid-pumping chamber independently of the engines.

3. A liquid propulsion engine comprising, supporting means, a plurality of internal combustion engines and a force pump mounted thereon, means operative to move the pistons of the engines and pump simultaneously and in the same direction, the pump cylinder having a compression chamber and a liquid pumping chamber formed therein on opposite sides of its piston head, means operative to introduce an explosive mixture into said compression chamber, means operative to convey the compressed gas from the compression chamber to the explosion chambers of the engines, and a valve controlled conduit leading to and from the liquid pumping chamber independently of the engines.

4. A liquid propulsion engine comprising, a plurality of force pumps, means connecting the pistons of said pumps operative to effect their simultaneous reciprocation, a plurality of two-cycle internal combustion engines, means drivingly connecting the pistons of said engines to said last mentioned means to actuate the same, each pump cylinder having a compressor chamber and a liquid-pumping chamber formed therein on opposite sides of its piston head, means for introducing a combustible gaseous mixture into each of said compressor chambers, conduits connecting each of said compressor chambers with the combustion chambers of certain of said engines to convey compressed gaseous mixtures thereto, and a valve controlled conduit leading to and from the liquid-pumping chamber independently of the engines.

HENRY R. POETKER.